Patented July 26, 1932

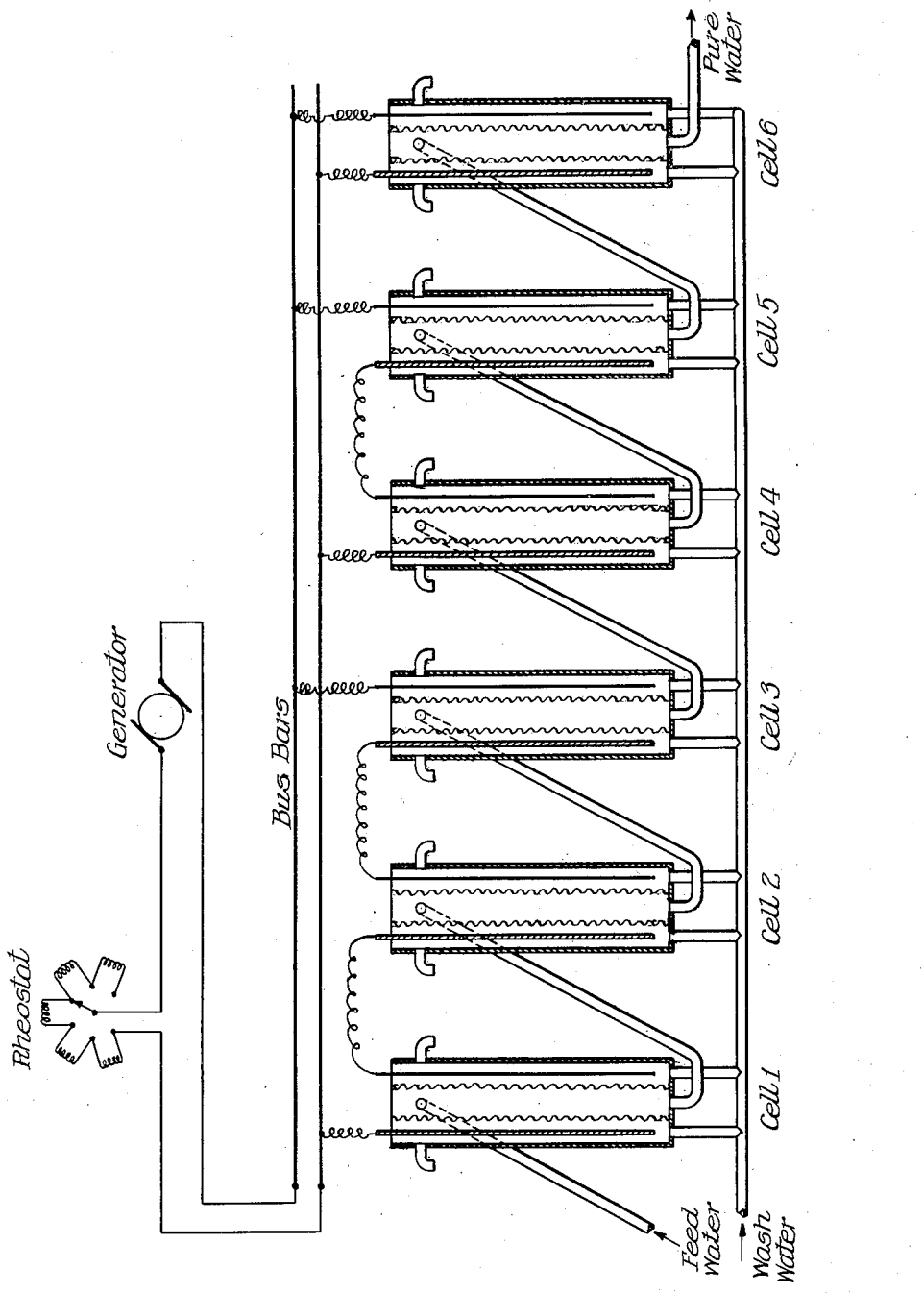

1,869,153

UNITED STATES PATENT OFFICE

ROBERT H. KEAN, OF CHICAGO, ILLINOIS, ASSIGNOR TO GENERAL ZEOLITE COMPANY, OF CHICAGO, ILLINOIS, A CORPORATION OF ILLINOIS

LIQUID TREATMENT

Application filed August 17, 1928. Serial No. 300,393.

This invention relates to the operation of electro-osmotic apparatus for liquid treatment, and particularly relates to the operation of such apparatus when used for the purification of water.

Electro-osmotic apparatus for liquid treatment usually consists of a series of cells through which the liquid being treated or purified is passed successively. Each cell is divided by means of permeable diaphragms into a number of compartments, through some of which is passed the liquid under treatment. In the remaining compartments are placed electrodes which are washed by streams of wash liquid passing through these compartments. The arrangement of the several compartments within a cell is such that each compartment containing liquid under treatment has next to it on one side a compartment containing a positive electrode or anode, and next to it on the opposite side a compartment containing a negative electrode or cathode. By means of these electrodes an electric current is caused to flow through the liquid under treatment.

The single figure of the drawing shows suitable electro-osmotic apparatus in which my invention may be effected. This apparatus consists of six electro-osmotic cells of usual construction and having series connections for water to be treated. Current is supplied to the cells by a direct current generator, for example. The voltage is conveniently controlled by a rheostat in series with the bus bars from which the current is taken by wires connected to the cells. Cells 1, 2 and 3 are connected in series to the bus line. Cells 4 and 5 are connected in series parallel to series connected cells 1, 2 and 3. Cell 6 is connected in parallel to series connected cells 4 and 5. Feed water enters cell 1 and progresses to cell 6, from which it leaves as pure water.

Cells of other construction than those above described may be employed for special purposes or to overcome the difficulties of different treatment processes.

The result of the electro-osmotic treatment of a liquid is usually the transfer of matter therefrom into the liquid used to wash the various electrodes employed in the process.

Electro-osmotic apparatus for the treatment or purification of liquids is usually operated continuously. When, for any reason, the continuity of the process is interrupted by cessation of the electric current, there is a tendency for the liquids contained in the various compartments of any cell in the apparatus, to diffuse into one another. Thus the treated, or partially treated, liquid left within the apparatus tends to become recontaminated with some of the materials removed from it, by diffusion of these materials back from the electrode compartments. This necessitates operation of the apparatus for a period of time, upon resumption of the process, to re-treat the liquid standing in the apparatus. During this period of operation electrode washing liquid is applied at normal rate, but no liquid to be treated is introduced into the apparatus nor is any treated liquid usually withdrawn from it. This period is characterized by the flow through the apparatus of a materially greater electric current than flows during normal operation. The excessive current gradually decreases during the period toward the normal operating current value. When this is reached, the feeding of raw liquid to the apparatus is begun, and normal operation is resumed.

This period of preliminary treatment or "pre-osmosis" consumes a disproportionate amount of electrical energy which is entirely wasted as it is consumed in bringing to its former state of purity the liquid under treatment in the apparatus at the time of shutdown. Furthermore, the delay in resuming normal operations, occasioned by the period of "pre-osmosis" may amount to half an hour or longer.

In many localities, due to the unequal demands upon central generating stations at various periods of the day it is possible for users of electrical energy to obtain very advantageous power rates during periods of low demand, and it is further advantageous to the consumer of electrical energy to maintain a steady load upon the generating station, rather than a fluctuating one.

Except for the period of "pre-osmosis" electro-osmotic processes are well adapted to utilize the advantages of "off-peak" energy rates. Thus the delay, and excessive energy demand incidental to starting up, or resuming, an interrupted electro-osmotic process may seriously interfere with the best utilization of such processes.

It is an object of this invention to eliminate the delay, and excessive use of electrical energy incidental to the resumption of an interrupted electro-osmotic process, or to the intermittent operation of such a process. When an electro-osmotic process is to be interrupted, the supplies of raw liquid and wash liquid are shut off in the usual manner. The supply of electrical energy is not entirely shut off from the apparatus, however, as is customary, but rather the voltage at which current is supplied is reduced to a minor fraction of the value at which the apparatus normally operates.

The voltage impressed upon the apparatus during the period of interrupted operation, or "stand-by", is governed by the nature of the process, the relative concentrations existing in the various compartments of the apparatus, the magnitude of the normal operating voltages of the several cells of the apparatus, etc. The optimum value, however, is that which is just sufficient to counteract or inhibit the diffusion of anions toward the cathode and of cations toward the anode which tends to occur in the absence of the electromotive force. With less voltage, some back diffusion of ions with consequent contamination of the liquid being treated will occur. With greater voltage, a gradual treatment or purification of the liquid will proceed until a condition of equilibrium between purification and back-diffusion will be established. In general, it has been found advantageous to employ a voltage of less than ¼ of the normal operating voltage.

An example of the use of the invention is as follows:

An electro-osmose apparatus being used to purify Chicago city water from 140 parts per million of total dissolved solids to 6 parts per million, operating under a potential of 115 volts, requires 1.25 amperes when producing 2.5 gallons of pure water per hour. This apparatus consists of six cells, connected in the following manner: the first, second and third cells in series, the fourth and fifth in series, and the sixth by itself, across the 115 volt line. After an overnight interruption of the process, approximately one-half hour of operation at full voltage is required before normal operation is resumed. During this time the amperage gradually decreases from approximately 3.5 amperes to 1.25 amperes. There is a maximum power demand of short duration equal to 280 per cent of the normal demand, and a delay of about one-half an hour in beginning the production of pure water. The non-productive energy consumed in the apparatus incidental to resuming operation is approximately 135 watt hours.

According to the present invention, this same apparatus operating under the same conditions was shut down by stopping the flow of the feed water and wash water, but a potential of 15 volts was impressed upon the apparatus, under which conditions about 0.1 ampere flowed. After 17 hours the full line voltage of 115 volts was impressed upon the apparatus, and the flow of feed and wash water resumed at full rate. Production of pure water at full rate began immediately with normal consumption of electrical energy. Upon resuming operation there was no delay in beginning the production of pure water, and there was no demand for power beyond that required for normal operation. The electrical energy consumed in the apparatus incidental to the shut-down was approximately 25.5 watt hours, or only 19% of that consumed by the method of the prior art.

It is to be noted that in the example cited the "stand-by" voltage is about ⅛ of the normal operating voltage, but this is not to be considered a limiting value. As stated above, the voltage required to maintain a rate of purification substantially equivalent to the rate of back-diffusion within any apparatus varies according to the specific conditions obtaining within that apparatus. In general, however, the "stand-by" voltage will be between 1/20 and ⅓ of the normal operating voltage, and it will always be a minor fraction of the normal operating voltage.

The present invention is widely applicable to the operation of electro-osmotic processes regardless of the particular method of construction of the apparatus, and of the nature of the liquid treatment involved.

Having thus described the invention, what is claimed is:

1. A process for the continuous electro-osmotic treatment of liquids which comprises maintaining electric potential gradients in bodies of the liquid being treated by means of positive and negative electrodes, separating said electrodes from said bodies of liquid by diaphragms and other bodies of liquid in contact with said electrodes and during periods of intermission maintaining electric potential gradients in said bodies of liquid such that the concentrations of electrolyte in said respective bodies of liquid remain substantially unchanged during said period.

2. In the continuous electro-osmotic treatment of liquids which comprises causing the liquid being treated to flow between positive and negative electrodes, separating said liquid from said electrodes by means of diaphragms and other bodies of liquid flowing between said electrodes and said diaphragms, impressing an electro-motive force upon said first and second mentioned bodies of liquid by means of said electrodes, and during periods of intermission in the treatment when said first and second mentioned bodies of liquid are not caused to flow, impressing upon said first and second mentioned bodies of liquid an electro-motive force equal to a minor fraction of that impressed during the normal treatment process.

3. In the continuous electro-osmotic purification of water, the process, during periods of intermission in the purification in which raw water and electrode wash water are not admitted to the apparatus, of impressing upon the apparatus a voltage of less than one-fourth of that at which the apparatus normally operates.

4. A process of operating an electro-osmotic apparatus provided with a series of compartments separated from each other by diaphragms, which compartments are adapted to contain electrodes and also adapted to contain the liquid to be treated and liquid for washing the electrodes which comprises causing the wash liquids and the liquid to be treated to pass through the compartments, maintaining a sufficient potential gradient during the period of liquid passage so that the concentration of dissolved impurities will decrease, then stopping the flow of the liquids through the compartments and maintain a decreased electrical potential gradient in the liquid body during this period of stopped flow so that the ion concentration of the dissolved impurities will remain substantially unchanged.

5. A process of operating an electro-osmotic apparatus provided with a series of compartments separated from each other by diaphragms, which compartments are adapted to contain electrodes and also adapted to contain the liquid to be treated and liquid for washing the electrodes which comprises causing the wash liquid and the liquid to be treated to flow through the compartments, impressing upon the apparatus the normal operating voltage which will result in a rapid removal of the dissolved impurities from the liquid being treated, then stopping the flow of liquid to be treated and wash liquid through the compartments, and during this period of stopped flow maintaining the liquid under potential.

6. A continuous electro-osmotic treatment of liquids which comprises placing the liquid being treated between positive and negative electrodes, separating said liquid from said electrodes by means of diaphragms, placing other bodies of liquid between and in contact with said electrodes and diaphragms, maintaining an electric potential between said positive and negative electrodes while causing said bodies of liquid to flow past the electrodes and diaphragms during operation, and during periods of intermission stopping the flow of liquids while maintaining between the electrodes a potential that is substantially less than the normal operating potential but sufficient to prevent diffusion or migration of anions toward the negative electrodes or cations toward the positive electrodes.

7. In the continuous electro-osmotic purification of water, the step which comprises maintaining during periods of intermission when the flow of water is stopped an electric potential across the liquid being treated and the electrode wash water, which potential is substantially less than the normal operating potential but sufficient to substantially prevent migration of anions toward the cathode or of cations toward the anode.

8. A method of operating an electro-osmotic apparatus provided with a plurality of compartments separated from each other by diaphragms, some compartments being adapted to contain the liquid being treated and others to contain electrodes and liquids for washing same, which comprises causing the wash liquid and the liquid to be treated to flow through the compartments, impressing upon the apparatus the normal operating voltage which will result in a rapid removal of the dissolved impurities from the liquid being treated, then stopping the flow of liquid to be treated and wash liquid to the compartments, and during this period of stopped flow impressing a voltage upon the apparatus which is insufficient to cause any substantial change in the concentration of dissolved impurities.

In testimony whereof I have hereunto subscribed my name.

ROBERT H. KEAN.